United States Patent [19]
Acernese et al.

[11] Patent Number: 5,788,858
[45] Date of Patent: Aug. 4, 1998

[54] MOBILE WATER PURIFICATION UNIT WITH MODULAR DECHLORINATION INPUT STAGE

[75] Inventors: Primo L. Acernese, Allentown; James Novak, Jr., Emmaus, both of Pa.

[73] Assignee: Terra Group, Inc., Allentown, Pa.

[21] Appl. No.: 642,637

[22] Filed: May 3, 1996

[51] Int. Cl.$^6$ .................................................. B01D 63/00
[52] U.S. Cl. .............................. 210/257.2; 210/321.6; 210/202; 210/456
[58] Field of Search ........................... 210/257.2, 195.2, 210/652, 263, 282, 286, 287, 288, 688, 757, 758, 903, 763, 651, 321.6, 456, 202

[56] References Cited

U.S. PATENT DOCUMENTS

| | | | |
|---|---|---|---|
| 3,182,803 | 5/1965 | Chisholm | 210/288 |
| 4,448,695 | 5/1984 | Gordon, Jr. et al. | 210/286 |
| 4,642,192 | 2/1987 | Heskett | 210/638 |
| 5,122,274 | 6/1992 | Heskett | 210/638 |
| 5,135,654 | 8/1992 | Heskett | 210/638 |
| 5,198,118 | 3/1993 | Heskett | 210/638 |
| 5,244,579 | 9/1993 | Horner | 210/636 |
| 5,269,932 | 12/1993 | Heskett | 210/638 |
| 5,275,737 | 1/1994 | Heskett | 210/638 |
| 5,300,224 | 4/1994 | Farley | 210/266 |
| 5,415,770 | 5/1995 | Heskett | 210/638 |
| 5,547,584 | 8/1996 | Cadehart | 210/652 |
| 5,599,456 | 2/1997 | Fanning | 210/688 |
| 5,632,892 | 5/1997 | Klein | 210/257.2 |

OTHER PUBLICATIONS

KDF Process Media Product Description, Fluid Treatment, Inc. (admitted as prior art) Sep. 9, 1993.

Primary Examiner—Ana Fortuna
Attorney, Agent, or Firm—Eckert Seamans Cherin & Mellott

[57] ABSTRACT

A transportable water purification unit with a reverse osmosis water purification unit (ROWPU), particularly for military use, is arranged to process municipal and other chlorinated water without damage to the reverse osmosis filtration elements. A modular transportable dechlorination device is coupled between the inlet of the ROWPU and a source of chlorinated water, such as a municipal fire hydrant, swimming pool, etc. The dechlorination device has a number of tubes mounted on a frame, at least some containing integral reticulated metallic dechlorination elements, the tubes being interconnected by quick connect removable U-fittings at their ends, whereby access is obtained to the reticulated elements, which can be in cartridges, and the order of the tubes along the flowpath can be altered. The reticulated dechlorination elements preferably comprise a Cu—Zn (brass) alloy and have a surface area to volume ratio of 200 to 500, preferably 300 to 350. The device allows a tactical-type water treatment installation to couple to any source notwithstanding chlorination, to purify water that may have been contaminated or even poisoned by chemical or biological agents.

14 Claims, 4 Drawing Sheets

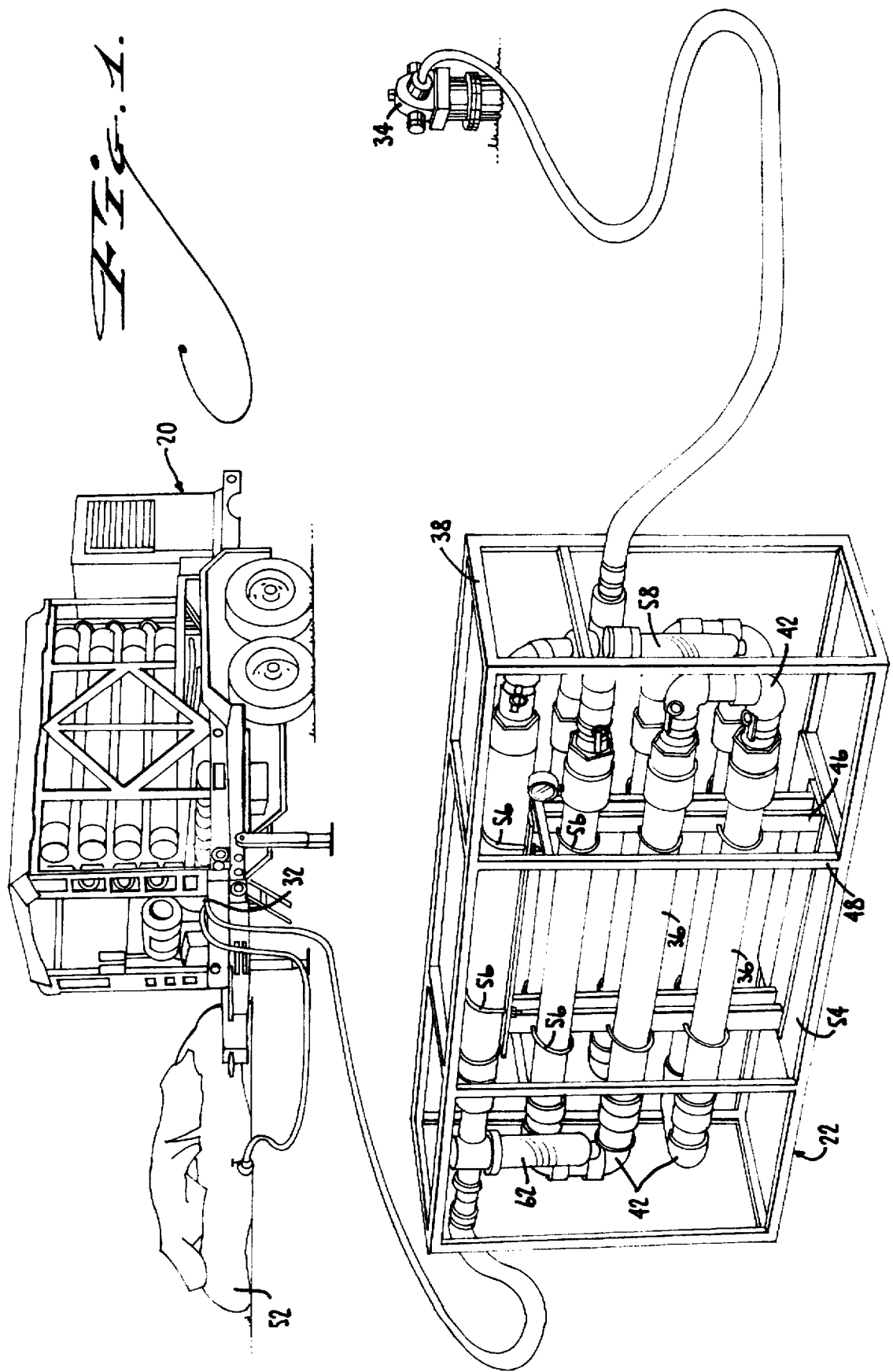

MOBILE WATER PURIFICATION UNIT WITH MODULAR DECHLORINATION INPUT STAGE

BACKGROUND OF THE INVENTION

1. Field of the Invention

The invention relates to the field of water purification, and in particular concerns modifying a mobile water purification system such as is used by military forces in the field, to include a modular input unit for dechlorination of water prior to treatment by reverse osmosis filtration equipment. This enables use of water that has already been processed and chlorinated, but is otherwise subject to suspicion.

2. Prior Art

Military forces require potable water in the field, and for any substantial deployment of troops it is conventional to provide water treatment facilities, usually mobile units carried by trucks or on trailers, which purify water that is then chlorinated and stored in large bladders from which the water is dispensed for use.

A standard form of water treatment unit is known in the US military as the Reverse Osmosis Water Purification Unit or by the acronym "ROWPU." The ROWPU employs successive levels of filtration. In addition to filtration of larger particles of organic and mineral materials, algae and microbes from the water, the ROWPU can eliminate many biological threats such as viruses and the like. This is accomplished in part by filtration through very small orifice membranes. The filtered water output from a ROWPU typically is chlorinated to prevent growth of organisms in the treated water. However, if one attempts to use chlorinated water as the input or source fluid to a ROWPU, the filtration elements are damaged. Therefore, ROWPUs are used to purify water from unchlorinated sources such as natural watercourses, i.e., lakes, streams, ponds and other sources of untreated water, and can be used to desalinate ocean water as well.

No timely, cost-effective or environmentally friendly process or apparatus exists to enable a ROWPU to use a chlorinated water source such as municipally treated water. The free chlorine ions in the water destroys the reverse osmosis filter elements. Chlorine can be removed or dissipated by batch-treatment of tanks of chlorinated water using chemicals prior to pumping the water through the ROWPU. This is disadvantageous due to the need to handle and use chemicals, and the corresponding risk of exposure of operators and the environment to spills or other chemical discharges. Alternatively, the water can be exposed to sunshine and evaporation until the chlorine dissipates. Both of these methods are complicated or inconvenient as to logistics and time.

Purified water is used for drinking water, cooking, washing, etc. Environmental damage can be caused by discharging chlorinated water as effluent into natural watercourses and the like, particularly over an extended period of time or in large quantities. It is likewise not possible to use a ROWPU to purify chlorinated water prior to discharge as effluent, for the same reason, namely damage to the reverse osmosis filter elements by chemical action of the chlorine.

In an urban deployment of troops, natural watercourses may be inconveniently located across populated areas from the sites to be used by troops. Thus, long connecting lines running from the watercourse to the ROWPU or from the ROWPU to the usage site may be required, presenting potential opportunities for damage, sabotage or for adverse parties to inject deleterious materials into the water flow. In addition, many urban watercourses are polluted or otherwise may require special attention to water treatment steps.

It is standard and prudent military policy to treat water from any supply that is not completely within its control, in order to protect the troops. Thus, the military normally will refrain from use of municipal water supplies when deployed, even when available, because the treatment is uncontrolled and there is danger of contamination. Nevertheless, in an urban situation when municipal water is available nearby, it would be advantageous to provide a method in which the municipal water could be purified safely, for example using a ROWPU.

Similar considerations apply to disaster relief situations. In a natural disaster, water treatment and distribution infrastructures can be damaged and supplies made unavailable or contaminated. The ROWPU is also useful in that case. Insofar as municipal sources are available but of questionable integrity, however, the fact that they may contain chlorine precludes purification of water through otherwise ready water supplies via a ROWPU.

Chlorine and some other chemicals can be removed from water by flowing the water over a bed of particulate material such as a copper-zinc alloy (i.e., brass with various proportions of copper and zinc). Under appropriate pH conditions, the zinc is reduced to form zinc chloride and the copper is oxidized to form copper oxide, these materials being formed or deposited on the surfaces of the particles in the bed. After a period of use, the brass can be restored for re-use by removing the deposits, for example by washing in an acid. Examples and variations on this concept are disclosed in U.S. Pat. Nos. 5,415,770; 5,314,623; 5,275,737; 5,269,932; 5,198,118; 5,135,654; 5,122,274; and 4,642,192, all to Heskett.

Particulate brass material is used according to Heskett because particles, and in particular small particles, present a greater surface area than larger particles or integral bodies of comparable weight. The proportion of surface area to volume is a function of particle size, smaller particles providing a greater exposed surface area than larger ones. There are drawbacks to using small particles. Handling is complicated by the flowable nature of loose particles, which necessarily must be confined by barriers so the particles do not move with the flow of water. Structures that confine small particles against flow cause flow resistance to the water and require a substantial pressure head. A dense or compacted body of small particles inherently resists water flow. A dense body of small particles also can be quite heavy. Vibration and shock can disturb the distribution of particles. Over time, with repeated cycles of use for dechlorination followed by acid washing, the volume of the solid particles is reduced and the particles disintegrate into smaller particles. Eventually, and the unit or the particle carriers therein must be replaced.

It would be advantageous to provide a dechlorination apparatus that is optimally equipped for use to pretreat chlorinated water prior to purification using a ROWPU, especially municipal water that may be of questionable integrity and requires purification, but also useful for other chlorinated sources such as the contents of swimming pools. Such a device would be durable, compact and light in weight, for easy transport and to survive deployment under adverse conditions. The device advantageously would employ an improved dechlorination element that is free of the drawbacks of loose particle elements, for example using a more integral dechlorination material that optionally can be disposed in cartridges and is characterized by high surface area and low flow resistance. The device also should be versatile as to connection particulars as well as readily deployed and connected.

SUMMARY OF THE INVENTION

It is an object of the invention to enable a modular dechlorination unit to be coupled as an input stage to a reverse osmosis water purification unit (ROWPU), such that the ROWPU can be used to purify water from any source, and in particular to ensure the safety of municipal or other chlorinated water supplies without damage to the ROWPU from the chlorine.

It is another object to provide a modular readily transported dechlorination unit as described, with a dechlorination element adapted for a single pass flow dechlorination treatment, comprising substantially integral bodies having high ratios of surface area to weight, in particular by using stacked reticulated metallic elements.

It is also an object to provide such a dechlorination unit with one or more tubes or flowpaths coupled by removable fittings to enable access to reticulated elements therein, or to permit variations of the particular flowpath of water through the unit.

It is a further object to provide an optimal reticulated element comprising brass, bronze, carbon, titanium or the like in integral units, especially a copper/zinc alloy (brass) in cylindrical or disc form that can be stacked in flow tubes or stacked in cartridges placed in flow tubes of the modular pretreatment unit.

It is a further object to embody the unit as a highly durable and long-lasting modular element suitable for military deployment, in particular having flow tubes arranged parallel to one another and secured on a frame support, with removable input/output fittings and preferably also intermediate end U-fittings, each of a quick connect structure for joining with the ends of the tubes, e.g., adjacent tubes to enable variations in the flow pattern such as zig-zag serial flow patterns and other serial and/or parallel flow between one or more inlets and one or more outlets, capable of treating at high flow rates and/or high chlorine concentrations.

These and other objects are accomplished by a transportable water purification unit with a reverse osmosis water purification unit (ROWPU), particularly for military use, arranged to process municipal and other chlorinated water without damage to the reverse osmosis filtration elements. A modular transportable dechlorination device is coupled between the inlet of the ROWPU and a source of chlorinated water, such as a municipal fire hydrant in an unsecured area, a questionable municipal source, a swimming pool, etc. The dechlorination device has a number of tubes mounted on a frame, at least some containing integral reticulated metallic dechlorination elements, the tubes being connected into a flow path and interconnected with one another by quick connect removable fittings engaging ends of the tubes, whereby access is obtained to the reticulated elements and/or the flow patterns and connections can be quickly changed to rearrange the pattern of flow or the order of the tubes along the flow path. The reticulated elements are preferably integral brass discs, which can be stacked in the tubes or in cartridges mounted in the tubes. The reticulated dechlorination elements have a surface area to volume ratio of 200 to 500, and preferable 300 to 350, being formed with open voids in an otherwise integral body of metal or metal coated material.

The device allows a tactical water treatment installation to couple to municipal water supplies at fire hydrants, or to other sources of chlorinated water, to purify water that may have been contaminated by chemical or biological agents, or may otherwise be deemed insecure. The device also provides a convenient and transportable water purification unit adapted to couple to the most readily available supplies of water, notwithstanding their chlorination, for use to provide potable water during emergency conditions such as natural disasters.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view illustrating application of the invention to adapt a reverse osmosis water purification unit (ROWPU) to the purification of water from a chlorinated source, shown as a municipal water supply accessed at a fire hydrant.

DETAILED DESCRIPTION OF THE PREFERRED EMBODIMENTS

Figure 3:
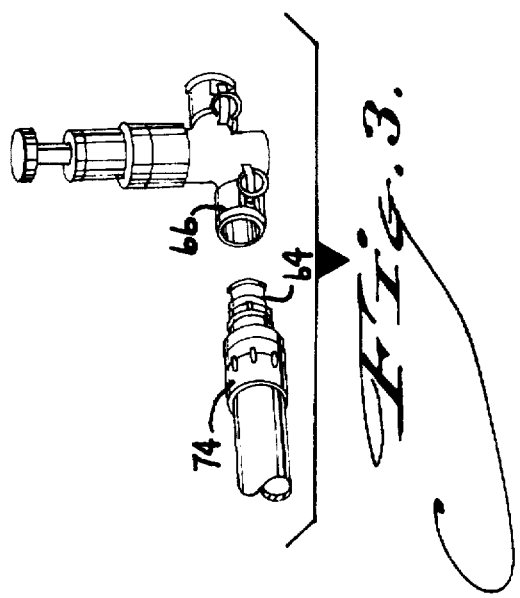
FIG. 3 is an exploded view showing an input quick coupling according to a further embodiment of the invention.

The invention as shown in FIG. 1 concerns a modular transportable water purification installation, especially useful for military deployment and for use in connection with supplying potable water in civil settings where water supplies are questionable, for example due to a natural disaster such as an earthquake, flood, etc. The water purification installation is normally employed temporarily, and comprises a reverse osmosis water purification unit (ROWPU) 20, but is enabled by use of a modular transportable dechlorination device or stage 22, to process chlorinated water, especially from treated municipal water sources, swimming pools and other sources of chlorinated water that are normally not useful as the chlorine can damage reverse osmosis purification membranes. The preliminary dechlorination unit 22 permits use of such convenient source while preventing damage to the filtration elements of the ROWPU 20.

The modular transportable dechlorination device 22 is coupled between the inlet 32 of ROWPU 20 and the source of chlorinated water, the example in FIG. 1 being a municipal fire hydrant 34. In a military situation the municipal water treatment facilities and infrastructure are deemed insecure. In a civil situation, the water source may be questionable due to potential contamination, for example due to flooding.

Dechlorination device 22 has a number of tubes 36 securely mounted on a frame 38, the tubes containing integral reticulated metallic dechlorination elements 44, shown in FIG. 8 and discussed in greater detail below. The elements are integral but characterized by numerous voids, and can be made of or surfaced with one or more metals that react with and immobilize chlorine in the water. A preferred material is an integral Cu—Zn alloy (brass), but bronze, titanium, carbon and plastic materials can be used and/or surfaced with a metal that reacts with and immobilizes chlorine.

The tubes 36 are connectable into one or more flowpaths and are interconnectable with one another by quick connect fittings engageable with the ends of the tubes. The tubes therefore are connectable in a variety of serial and/or parallel configurations defining serial or parallel paths between one or more inlets and one or more outlets. To couple given tubes in series, quick connect removable U-fittings 42 are attached at the respective tube ends. The quick connect fittings also enable access to reticulated elements 44, which can be simply stacked in tubes 36 or carried in cartridges that fit in the tubes. The quick connect couplings 42 permit the flow configurations and directions, and the order of the respective tubes 36 to be altered along the water flowpath from time to time.

The reticulated dechlorination elements 44 are integral bodies, for example of a foamed Cu—Zn alloy (i.e., brass), and are therefore quite durable yet relatively light in weight. The preliminary dechlorination unit 22 is mounted on a frame structure 38 for ease of handling, and preferably comprises internal support frame elements 46 and an external protective cage-like frame 48.

The device 22 substantially improves the practical usefulness of the ROWPU 20, which is a known military water purification unit, but is applied only to unchlorinated sources such as natural watercourses because chlorine damages reverse osmosis membranes. By adapting the ROWPU to purify chlorinated sources the invention allows a tactical water treatment installation or a temporary civil installation to couple to municipal water supplies at fire hydrants, swimming pools and other sources, to purify water that may have become contaminated or may have been tampered with by introduction of chemical or biological agents. Thus the invention better adapts the ROWPU to deployment in populated areas where such infrastructure is substantially more accessible and generally useful than a suitable watercourse or other natural water source.

In FIG. 1, the ROWPU 20 as shown can be a trailer carried self-contained filtration unit. ROWPU 20 defines a flowpath passing a plurality of filtration levels, including filters for particulate material and also reverse osmosis membranes. The ROWPU has on-board water pumps and/or can be coupled to separate pumps that provide a differential pressure across the reverse osmosis membranes. The reverse osmosis membranes filter virtually to a molecular level, permitting water to pass through to a lower pressure side, and blocking impurities, ions in solution and the like. The pumps provide for a flow to remove water on the high pressure side of the membranes, where impurities are relatively more concentrated as a result of the filtration. This water is discharged as effluent or stored as brine for further treatment.

The output of ROWPU 20 is collected in a suitable receptacle and typically chlorinated to prevent later growth of algae or bacteria. In tactical deployments and the like, the typical receptacle is an expandable bladder tank 52.

Although in FIG. 1 preliminary dechlorination unit 22 is coupled directly between fire hydrant 34 and ROWPU 20, additional pumps (not shown in FIG. 1) can be provided to assist in the flow as necessary.

In FIG. 1, dechlorination unit 22 has internal structural supports 46 attached rigidly to a baseplate 54 that in turn is attached to a protective rectilinear cage-like frame 48. Tubes 36 are attached to the internal structural members 46, by U-bolts or straps 56 such that tubes 36 are securely mounted. As a result, the dechlorination unit 22 can be handled as a unit, easily moved on or off of a vehicles, air dropped or released from a moving vehicle, etc.

In the embodiment shown, the elongated tubes 36 are horizontal and parallel, and are relatively closely spaced. This is a compact and stable configuration. It is also possible to arrange a similar set of tubes vertically (i.e., for a small footprint), or to provide sets of tubes that do not all run parallel, for example with alternating levels of tubes running perpendicular to one another to form an overall cubic shape, etc.

The dechlorination unit 22 in FIG. 1 has an inlet filter 58 to capture particulate material, and an outlet filter 62 to capture any pieces of the foamed-brass integral filter elements 44 that may become dislodged. The quick connect fittings permit convenient attachment of various apparatus such as filters, pressure gauges, testing and sampling ports, flowmeters and the like, at any desired point in the flowpath. This simply involves substituting a direct connection end fitting with an end fitting containing the apparatus.

Figure 2:
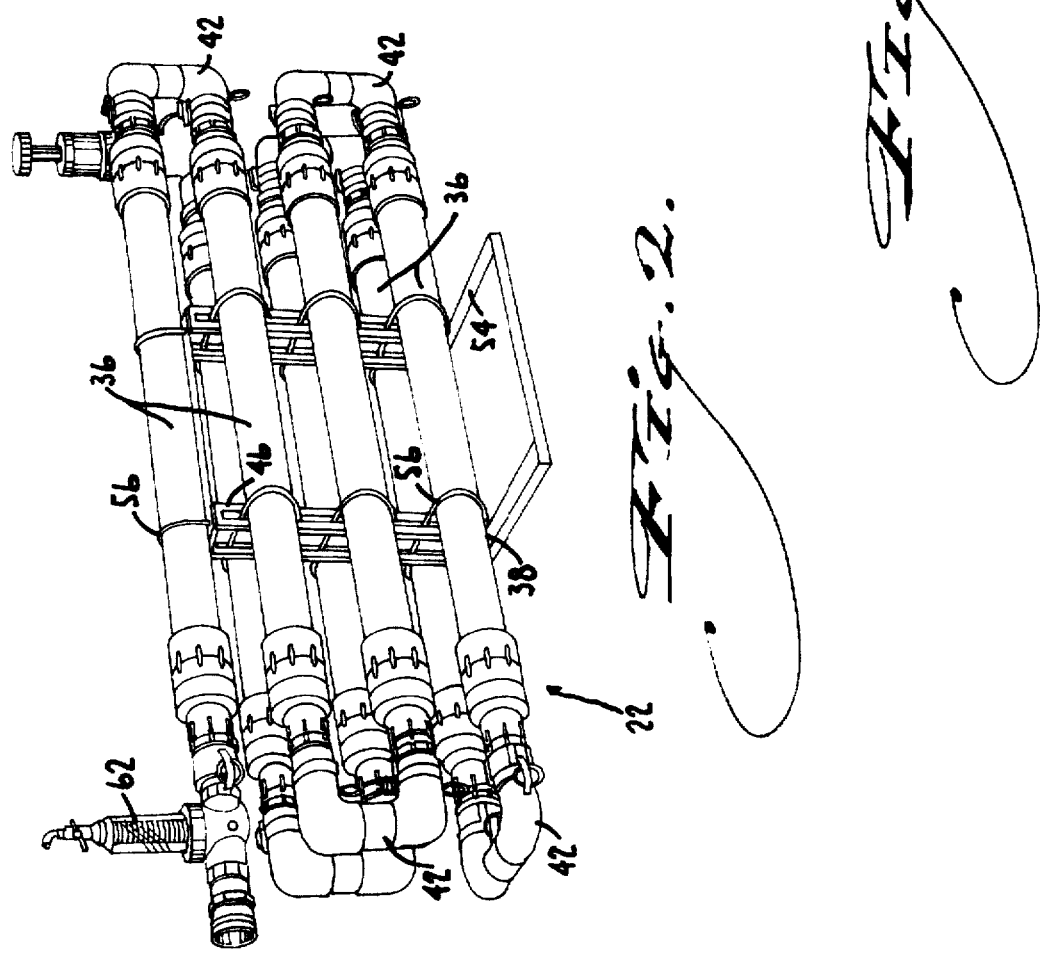
FIG. 2 is a perspective view illustrating the preliminary dechlorination unit according to another embodiment.

For example, FIG. 2 shows an embodiment of the dechlorination unit without protective cage 48. In FIG. 2, the inlet side of the unit is equipped with a pressure regulation valve instead of an inlet filter. However, due to the quick connect couplings 42 provided on the unit, it is possible to provide for pressure regulation and filtration by simply adding on the necessary modular elements using appropriate male and female quick connect couplings 64, 66.

The quick connect couplings permit variations in the flowpath according to various configurations that may be desirable in a given situation. In the embodiment shown, tubes 36 are connected to one another serially, defining a single flowpath of a length equal to the sum of the lengths of the tubes shown. A serial arrangement subjects the water to the greatest possible treatment surface area but is characterized by the greatest possible flow resistance. A serial configuration may be desirable when the water being treated is heavily chlorinated. Depending on the extent of dechlorination treatment needed and the desired pressure and flow rate criteria, the quick connect end fittings enable other possible connections as well. Any number of tubes in parallel, multi-parallel, series and parallel/series arrangements can be provided by using suitable branching end connectors such as tri-connectors (one inlet, three outlets) or other numbers of connections in a manifold-like fitting. It is also of course possible to employ a plurality of dechlorination units in serial and/or parallel arrangements, using flexible hoses where necessary for coupling from the tubes of one unit to those of another unit.

Figure 4:
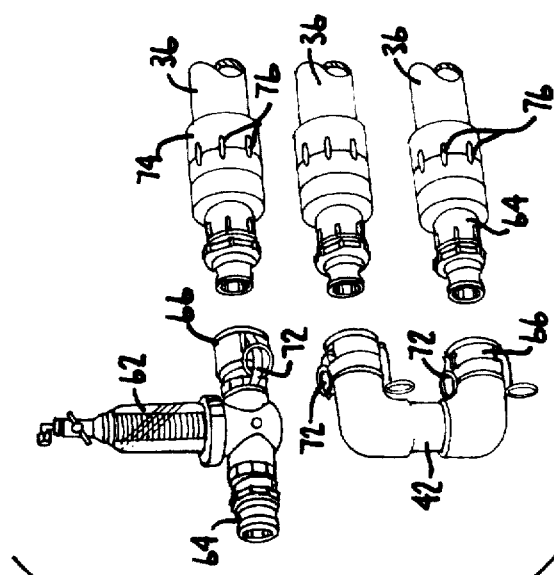
FIG. 4 is an exploded view showing intermediate and output quick couplings.

FIGS. 3 and 4 illustrate exemplary couplings in detail. The tubes 36 carrying the dechlorination filter elements 44 can comprise, for example 10 cm diameter polyvinyl chloride (PVC) plastic tubes of about 1.8 m in length, having mounted at each end a male coupling 64 or female coupling 66. The couplings 64, 66 attached to tubes 36 preferably are removable from the tubes as well as detachable from the complementary couplings, to facilitate access to filter elements 44 in tubes 36, e.g., the side of each coupling at tubes 36 being threadably attached to a complementary element or nipple that is rigidly attached to the tube by PVC welding adhesive. In the embodiment shown, tubes 36 have attached male quick couplings 64 with annular grooves, and the short connection tubes coupled to the tube ends have female fittings 66 with bale-like levers 72 for shortening the internal circumference of the female fittings 66 to engage in the annular grooves and lock the connection. The male couplings 64 are removably attached to threaded collars 74, permanently affixed on tubes 36. External ridges 76 parallel to the longitudinal axes of the threadable parts of the quick couplings 64 and/or on the complementary threaded collars 74 are engageable using a strap wrench to tighten and loosen the mountings of the quick couplings at the threads.

It is also possible permanently to attach female quick couplings 66 on the tube ends rather than male ones, which has the advantage of permitting easier access to the elements inside the tubes without the need to remove threaded fittings. In that event the short connection tube at the ends (as well as any auxiliary elements such as filters and pressure regulators) comprise complementary male fittings.

Figure 5:
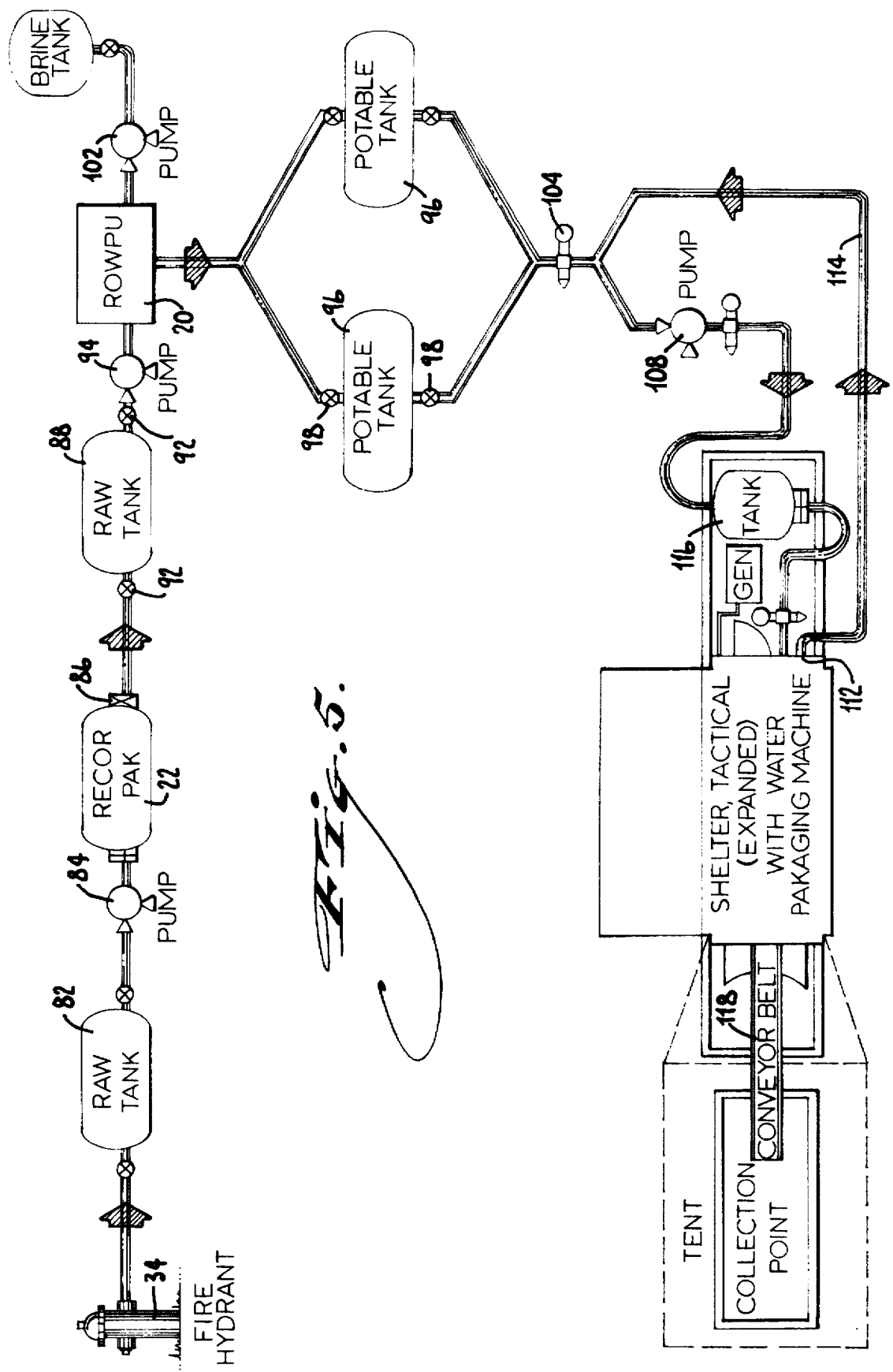
FIG. 5 is a schematic diagram showing the elements of a ROWPU water purification unit coupled to a municipal supply.

FIG. 5 schematically illustrates how the invention is applied in a practical embodiment. A water purification system is to be coupled to a municipal water supply, for example at a fire hydrant. In order to permit variations in flow rates or intermittent operation at different points along the path, water is accumulated in a raw tank 82 initially, and passed through dechlorination unit 22 as described above, under pressure from an inlet pump 84. Preferably, a sample valve 86 is provided downstream of raw tank 82 along the flowpath, for monitoring the quality of inlet water. Inlet pump 84 forces the water to flow through an inlet filter or pre-filter 58, the dechlorination elements 44, and an outlet filter 62 that provides a point where water can be extracted for sampling purposes. The water is pumped under moderate pressure, for example a maximum of 60 PSI (4.1 bar), and a flow rate of 30 GPM (approx. 115 liter/m), which can be readily withstood by the PVC tubes and connectors. A more pressure-resistant unit is also possible using heavier pipes and the like. The output of dechlorination unit 22 can be collected in a dechlorinated raw water tank 88. Each of the tanks in the system shown can be an expandable bladder tank, e.g., with a 3K gal. (11K liter) capacity.

The dechlorinated raw tank 88 is coupled to ROWPU 20 by a gate valve 92 and a second pump 94 for providing a pressure head for forcing the water through the reverse osmosis membranes and other filter elements. This second pump 94 can be provided on ROWPU 20 or as a separate element. Water passing through the ROWPU filter elements is collected in one or more potable water tanks 96 having gate valves 98 at the inlets and outlets. A brine pump 102 removes water in which impurities have been concentrated by the filtration process. Depending on the use of the water and the time period for its storage, the ROWPU-filtered output water can be chlorinated again at this point.

A further sampling valve 104 enables monitoring of the water in potable water tanks 96. A usage pump 108 pressurizes the water and directs it along to the ultimate outlet 112 for use. FIG. 5 shows an establishment for packaging water in containers. The usage pump is coupled in a recirculating loop 114 with a pressurized tank 116 from which water can be dispensed into containers that are then moved along a conveyor 118 to be removed by users. Spillage can be recirculated in this embodiment. Other applications, such as use of water for rinsing purposes, may also use recirculating techniques. Alternatively, a single path straight line discharge is also possible. Insofar as spent chlorinated water may be collected for discharge as effluent, an additional dechlorination unit 22 (not shown) can be provided upstream of the point of discharge, for removing chlorine prior to ground discharge or discharge into a natural watercourse or the like.

Figure 7:
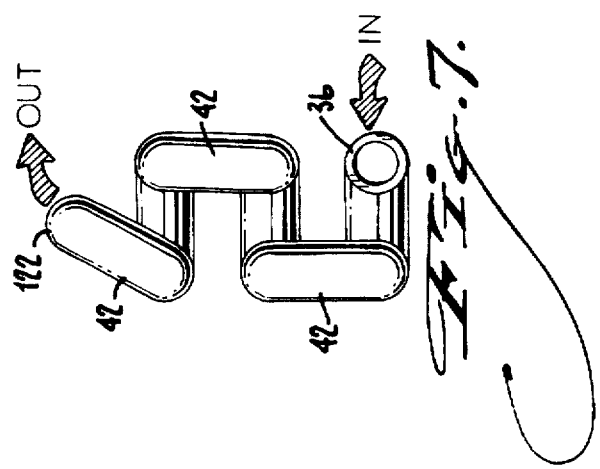
FIG. 7 is a simplified illustration corresponding to FIG. 6 and showing a different configuration of the quick couplings.
Figure 6:
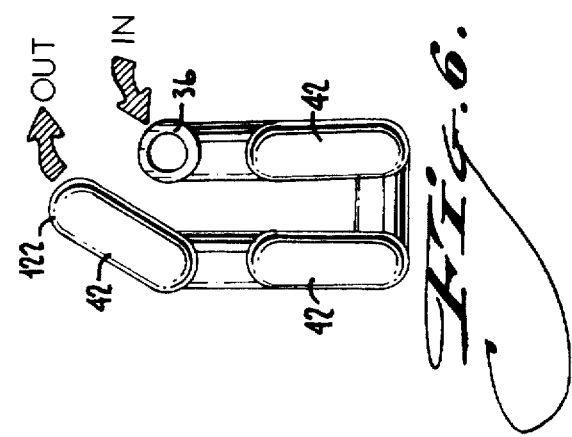
FIG. 6 is a simplified illustration of one configuration of quick couplings according to the invention.

FIGS. 2, 6 and 7 show that tubes 36 of dechlorination unit 22 are arranged parallel to one another in the embodiment shown, and are spaced such that the end connecting legs 42 can span laterally between tubes 36 on the same vertical level, or vertically between tubes 36 disposed over one another. In this embodiment, a centered upper tube 122 is mounted over three vertically spaced pairs of tubes 36. The centered upper tube 122 is spaced from the adjacent pair such that the three tubes are on axes corresponding to an equilateral triangle. Thus in addition to coupling laterally or vertically, end members 42 can couple either of the tubes in the upper pair to the centered upper tube 122. Additional tubes (not shown) can be included, on axes that are likewise equidistant from two adjacent tubes, defining an equilateral triangle. In FIGS. 6 and 7, for example, four laterally spaced tubes can be mounted, two on each side, at heights between the intermediate tube and the upper and lower tubes, respectively, and defining equilateral triangles. The laterally spaced tubes are then coupleable at either end to one another or to the center or respective upper or lower tube, adding additional versatility.

By providing quick connect end couplings 42 that can be rearranged readily, the flowpath through the dechlorination unit can be changed as required. Particular tubes 36 can be removed from a serial connection of the other tubes; separate flowpaths can be provided (e.g., two or more inlets and/or outlets), etc. It is a characteristic of dechlorination using an elongated path through dechlorination filter or treatment elements, that the upstream filter elements tend to become exhausted first, by build-up or plating of chlorine compounds that tend to obstruct contact between the chlorine ions in the water and the elemental metal of the dechlorination element. This obstruction generally occurs and affects the dechlorination efficiency of the upstream filter elements, before the filter elements that are further downstream. The time between servicing or replacement of filter elements can be extended by varying the serial connection of tubes 36 to place different tubes at the upstream side of the flowpath at different times. FIGS. 6 and 7 illustrate two exemplary connection configurations, the filter tubes 36 being viewed endwise in elevation. As discussed above, various other configurations are also possible.

When the filter elements eventually become exhausted by the accumulation of plating and the like on the surfaces of the metal, they can be recharged by removing the accumulations using an acid such as muriatic acid. After treatment, the filter elements are again ready for dechlorination use. An acid wash tends to remove some of the metal material from the reticulated element. However a reticulated element, unlike particulate filtration media or perhaps fibrous media, is substantially integral, i.e., the metal portions are structurally connected and tend to remain attached. Therefore, although metal is removed from the outer surfaces by the acid wash, the release of discrete metal particles of metal into the flow is reduced in comparison to particulate elements or thin fibers.

Figure 8:
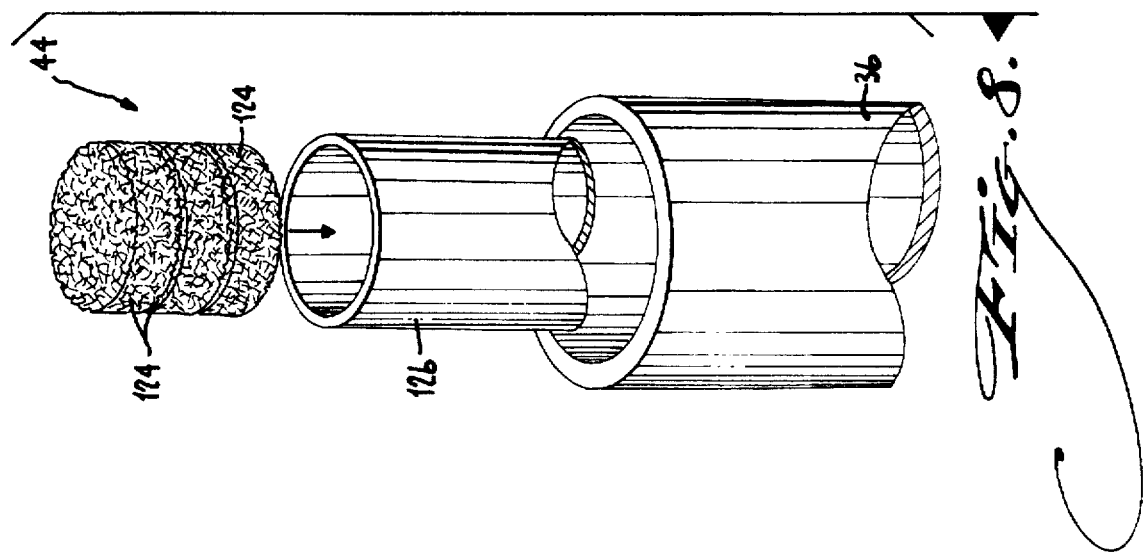
FIG. 8 is a perspective view, partly cut away, illustrating the reticulated integral metallic filter elements of the invention, in particular to be loaded into a cartridge and mounted in a filter tube length.

Reticulated dechlorination filter elements 44 are shown in FIG. 8. Reticulated elements are formed as integral bodies of metal but are shaped to define numerous pores, fissures and openings through which water can flow. Reticulated or foamed metal is known, and can be made by solidifying molten metal in the presence of a removable material or a gas that occupies spaces that become fixed fissures after solidification. The result is a suitably durable integral metal body having a high proportion of surface area to unit volume and to weight. The reticulated brass dechlorination elements comprise stacked disks 124 or stacked disks carried in cartridges 126 received in tubes 36. Either the cartridges 126 or the disks 124 themselves substantially occupy the lumen of tubes 36 such that water passes through and over the surfaces of the metallic filter elements, the elemental metal of the filter elements reacting with the chlorine in the water.

A preferred material is a Cu—Zn alloy (i.e., brass), which captures chlorine in a reaction resulting in zinc chloride and copper oxide. These elements also remove some other materials such as hydrogen sulfide, and the metal ions in the water discourage the growth of bacteria and algae. Dechlorination is thus effected efficiently, particularly if the water has a pH slightly on the acidic side, e.g., from 5.0 to 7.0. Other integral metal elements are possible, either alone or in combination with elements of other metals or materials, for example comprising bronze, carbon, titanium, etc., which react with chlorine or other ions that are advantageously immobilized for removal. The chemically-active metals and the like are preferably provided in durable and long-lasting integral bodies, but also can be provided as a metal plating on a carrier such as a foamed (reticulated) plastic carrier.

The reticulated dechlorination elements 44 have a high ratio of surface area to volume. For brass elements the ratio of surface area to volume can be about 200 to 500, and preferably 300 to 350. The chlorine removing filter elements are used together with one or more particulate filters 58, 62 disposed at least at one of an inlet and an outlet of the modular dechlorination apparatus 22. As noted above, the unit is preferably coupled on the inlet side of a ROWPU 20 for dechlorinating water from a municipal or other chlorinated source. It is also possible to use the device as a means to dechlorinate spent chlorinated water before discharging it as effluent containing chlorine that could potentially damage the ecology of a natural watercourse.

The dechlorination unit and the combination of the dechlorination unit with a ROWPU extend the capability of water treatment to any source, including chlorinated water along with salt, brackish and fresh water sources. In addition to removal of chlorine, the dechlorination unit removes hydrogen sulfide, iron, certain heavy metals and reduces or eliminates biofilm buildup in the water carrying structures and on filtration elements downstream. As a result the dechlorination unit extends the useful life of the ROWPU filter elements and reduces the need for maintenance and downtime. Thus the unit provides costs savings in hardware and manhours while contributing to the readiness of the military and the civil defense authorities to respond quickly and effectively to needs for safe potable water.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A water purification unit, comprising:
   a transportable reverse osmosis water purification unit (ROWPU) operable to purify water supplied at an inlet thereto;
   a modular dechlorination apparatus coupled between the inlet or the ROWPU and a source of chlorinated water, wherein the modular dechlorination apparatus comprises a plurality of tubes containing reticulated metallic dechlorination elements mounted on a frame, said tubes being interconnected with one another to provide at least one flow path encompassing the reticulated dechlorination elements to provide preliminary treatment to the chlorinated water: wherein at least some of the tubes are equally spaced in an array and connected by U-shaped fittings alternatively coupleable to different pairs of the tubes to change the flow path through the dechlorination apparatus: and wherein the U-shaped fittings are attachable to the tubes by quick disconnect fittings.

2. The water purification unit of claim 2, wherein a plurality of the tubes are arranged parallel to one another in an array and ends of tubes in the array are coupled to one another at respective ones of the ends by removable U-shaped end fittings.

3. The water purification unit of claim 1, wherein the reticulated dechlorination elements comprise stacked disks carried in cartridges received in the tubes.

4. The water purification unit of claim 2, wherein the reticulated dechlorination elements comprise a Cu—Zn (brass) alloy and have a surface area to volume ratio of 200 to 500.

5. The water purification unit of claim 4, wherein the reticulated dechlorination elements have a surface area to volume ratio of 300 to 350.

6. The water purification unit of claim 1, wherein the reticulated dechlorination elements comprise at least one of brass, bronze, carbon and titanium, disposed at least on an outer surface of an integral carrier defining voids through which water passes through the elements.

7. The water purification unit of claim 2, further comprising at least one particulate filter disposed at least at one of an inlet and an outlet of the modular dechlorination apparatus.

8. A modular dechlorination unit for preliminary dechlorination of water supplied to an inlet of a field deployed reverse osmosis water purification unit (ROWPU) operable to purify water supplied at an inlet thereto, comprising:
   a plurality of tubes mounted on a transportable frame, at least some of the tubes containing integral reticulated metallic dechlorination elements, and the tubes being interconnected with one another to provide at least one flow path encompassing the reticulated metallic dechlorination elements from an inlet coupleable to a chlorinated water supply and an outlet coupleable to the inlet of the ROWPU; wherein a plurality of said tubes are arranged in a spaced array and ends of the tubes in the array are coupled to one another at respective said ends by removable U-shaped end fittings; wherein at least some of the tubes are equally spaced in the array and the U-shaped fittings alternatively couple different pairs of the tubes to change a flowpath through the modular dechlorination apparatus.

9. The modular dechlorination unit of claim 8, wherein the U-shaped end fittings are attachable to the tubes by quick disconnect fittings.

10. The modular dechlorination unit of claim 8, wherein the reticulated dechlorination elements comprise stacked disks carried in cartridges received in the tubes.

11. The modular dechlorination unit of claim 8, wherein the reticulated dechlorination elements comprise a Cu—Zn (brass) alloy and have a surface area to volume ratio of 200 to 500.

12. The modular dechlorination unit of claim 11, wherein the reticulated brass dechlorination elements have a surface area to volume ratio of 300 to 350.

13. The modular dechlorination unit of claim 8, wherein the reticulated dechlorination elements comprise at least one of brass, bronze, carbon and titanium, disposed at least on an outer surface of an integral carrier defining voids through which water passes through the elements.

14. The modular dechlorination unit of claim 8, further comprising at least one particulate filter disposed at least at one of an inlet and an outlet of the modular dechlorination apparatus.

* * * * *

UNITED STATES PATENT AND TRADEMARK OFFICE
CERTIFICATE OF CORRECTION

PATENT NO. : 5,788,858
DATED : August 4, 1998
INVENTOR(S) : Primo L. Acernese and James Novak, Jr.

It is certified that error appears in the above-indentified patent and that said Letters Patent is hereby corrected as shown below:

Column 10, Claim 2, line 21, after the word "claim", delete "2" and substitute therefor --1--.

Column 10, Claim 2, line 21, delete "a" and substitute therefor --said--.

Column 10, Claim 2, line 24, delete "removable" and substitute therefor --said--.

Column 10, Claim 4, line 29, after the word "claim", delete "2" and substitute therefor --1--.

Column 10, Claim 7, line 43, after the word "claim", delete "2" and substitute therefor --1--.

Signed and Sealed this

Nineteenth Day of January, 1999

Attest:

Attesting Officer

*Acting Commissioner of Patents and Trademarks*